United States Patent [19]
Bedell et al.

[11] Patent Number: 5,734,685
[45] Date of Patent: Mar. 31, 1998

[54] CLOCK SIGNAL DESKEWING SYSTEM

[75] Inventors: Daniel J. Bedell, Portland, Oreg.;
Charles A. Miller, Fremont, Calif.

[73] Assignee: Credence Systems Corporation, Fremont, Calif.

[21] Appl. No.: 582,922

[22] Filed: Jan. 3, 1996

[51] Int. Cl.$^6$ .................................................... H04L 7/00
[52] U.S. Cl. .................................................... 375/356
[58] Field of Search ................................. 375/356, 211;
371/1; 370/501, 502, 519

[56] References Cited

U.S. PATENT DOCUMENTS

| | | | |
|---|---|---|---|
| 3,496,477 | 2/1970 | Page | 327/20 |
| 4,411,007 | 10/1983 | Rodman et al. | 375/356 |
| 4,447,870 | 5/1984 | Tague et al. | 395/556 |
| 4,998,262 | 3/1991 | Wiggers | 375/356 |
| 5,293,626 | 3/1994 | Priest et al. | 29/893.1 |
| 5,298,866 | 3/1994 | Kaplinsky | 327/261 |
| 5,305,451 | 4/1994 | Chao et al. | 395/555 |
| 5,361,277 | 11/1994 | Grover | 375/356 |
| 5,369,640 | 11/1994 | Watson et al. | 371/1 |
| 5,432,823 | 7/1995 | Gasbarro et al. | 375/356 |

*Primary Examiner*—Stephen Chin
*Assistant Examiner*—Kevin Kim
*Attorney, Agent, or Firm*—Smith-Hill and Bedell

[57] ABSTRACT

A system for distributing synchronized clock signals to spatially distributed circuits includes a pair of transmission lines, each extending between first and second sites. The transmission lines are interconnected at the second site so that an outgoing clock signal traveling on the first transmission line from the first site to the second site returns to the first site on the second transmission line. Spatially distributed deskewing circuits tap the signal transmission lines between the first and second sites. A first delay circuit in each deskewing circuit detects the outgoing clock signal on the first transmission line and produces a local clock signal that lags the outgoing clock signal by an adjustable delay time. A similar second delay circuit in each deskewing circuit delays the local clock signal by a similar adjustable delay time to produce a local reference signal. A phase lock controller in each deskewing circuit adjusts the delay times of the delay circuits so that the local reference signal is phase locked to the returning clock signal on the second transmission line. When reference signals in all deskewing circuits are phase locked to the returning clock signal, their local clock signals have similar phases regardless of the spatial distribution of the deskewing circuits that generate them.

16 Claims, 4 Drawing Sheets

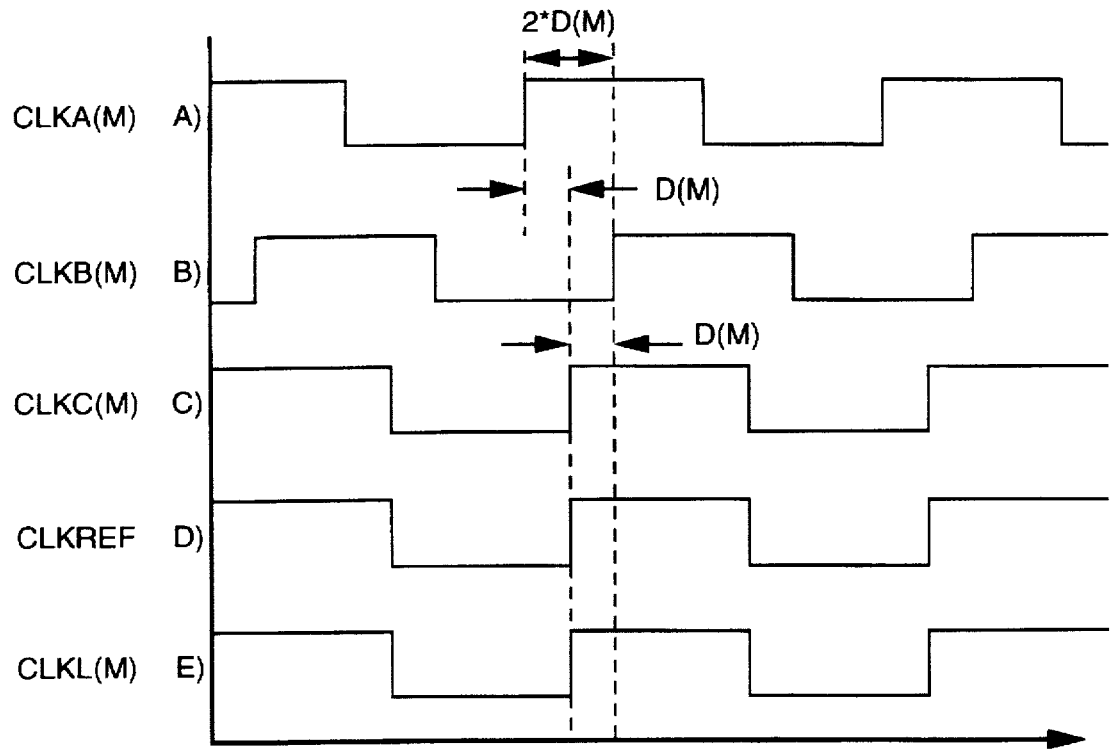
FIG. 3
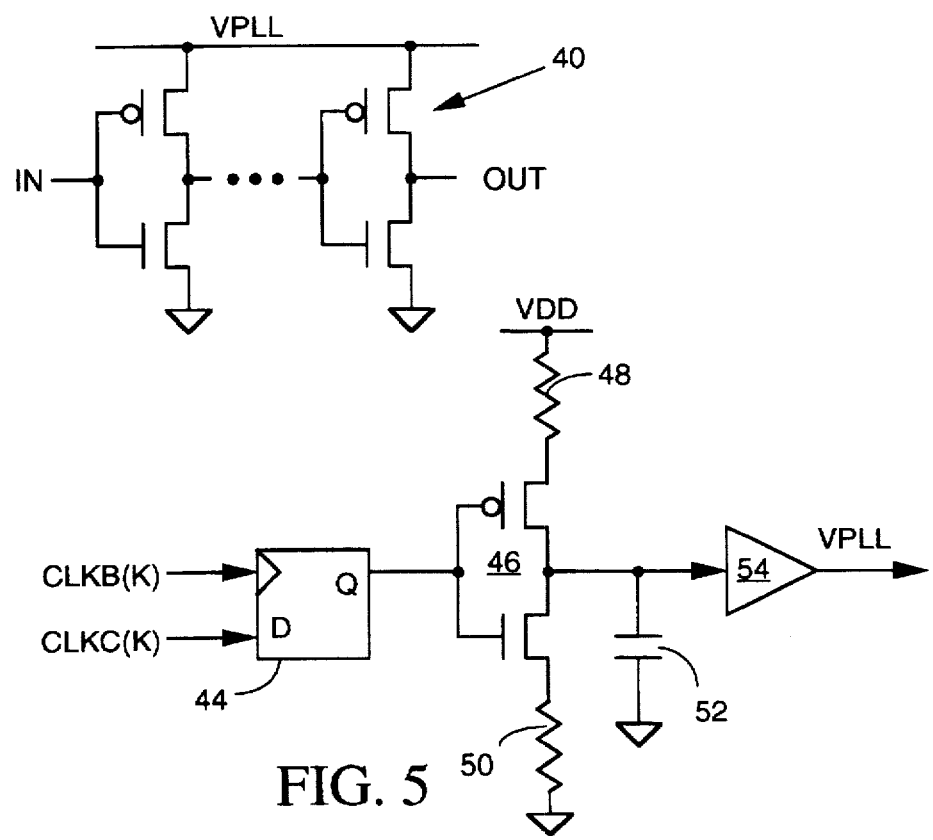
FIG. 4
FIG. 5

CLOCK SIGNAL DESKEWING SYSTEM

BACKGROUND OF THE INVENTION

1. Field of the Invention

The present invention relates to a system for deskewing clock and other signals passing between distributed modules of a digital system.

2. Description of Related Art

In a digital system formed by a set of interconnected operating modules, one of the signals distributed to each module is a clock signal for controlling the timing of data transfer operations between the modules. For example a computer may include several circuit boards or distributed processors mounted in a chassis and interconnected by backplane wiring to a module containing a central controller and a clock signal source. One of the conductors in the backplane carries the clock signal to each of the other modules in the system. For proper operation of the circuit, clock signal pulses should arrive at the various modules at substantially the same time; otherwise reliable data transmission is not ensured. However, since the modules are at varying distances along the backplane from the clock signal source, the clock signal pulses do not arrive at each circuit board concurrently. Such clock signal skew is tolerable at lower clock signal frequencies where it is small compared to the period of the clock signal. But at higher clock frequencies where clock signal skew becomes a significant portion of the clock signal period, data transmission on the backplane becomes unreliable.

Signal skew can also be a problem in electronic instruments having distributed components that must operate together in a synchronous manner. For example, an integrated circuit (IC) tester may include a host unit and multiple operating modules spatially distributed but interconnected for communicating with the host unit. Each operating module may provide an interface to a separate pin of an IC under test. At various times, an operating module may transmit a test signal to an IC pin or may acquire output data produced by the IC at the pin. One of the functions of the host unit is to coordinate the actions of the operating modules. For example, to signal the start of a test the host unit may transmit a "start" signal to each operating module. The host unit may also transmit a global clock signal to each operating module to synchronize the actions of the operating modules during the test and to synchronize data transmission between the host and the modules during the test. If the clock and other control and data signals travel varying distances to reach the operating modules, they arrive at the various modules at different times. Such control and clock signal skew, if sufficiently large, can result in a timing mismatch between module operations and can adversely affect synchronous communications between the modules and the host unit.

U.S. Pat. No. 5,369,640 issued Nov. 29, 1994 to Watson et al, describes a system for reducing skew in a signal sent to remote operating modules by providing a separate transmission line from the source to each operating module and by adjusting the transmission lines so that they all have the same length. However this "star bus" solution to the signal skew problem can be somewhat unwieldy in systems having a large number of operating modules because so many transmission lines must emanate from the signal source.

Another method for eliminating clock signal skew is described in U.S. Pat. No. 4,447,870 issued May 8, 1984 to Tague et al. Here an adjustable delay circuit is provided on each operating module for further delaying the clock signal after it arrives at each operating module. The delay circuit in each operating module is adjusted so that the sum of delays provided by the clock signal transmission line and the adjustable delay circuit is equal to a standard delay. This method allows the clock signal to be delivered to the operating modules through a single transmission line connected to all operating modules as in a backplane. However it requires a time-consuming and difficult process of manually calibrating the delay circuit in each operating module. Whenever an operating module is moved to a new position along the transmission line its clock delay circuit must be readjusted.

U.S. Pat. No. 5,361,277 issued Nov. 1, 1994 to Grover describes a system for delivering a phase synchronized clock signal to each of several distributed circuit modules. The system employs parallel "outgoing" and "return" transmission lines routed to each module. A clock source transmits an outgoing clock signal on the outgoing transmission line to each module in turn and then to a distant point beyond the last module where the outgoing and return transmission lines are tied together. The clock signal then returns from the distant point passing each module in reverse order via the return transmission line. A deskewing circuit at each module taps the transmission lines as they pass the module. The deskewing circuit monitors the phases of outgoing and returning clock signals and produces a local clock signal having a phase that is midway between the phases of the outgoing and returning clock signals. The local clock signals produced by all deskewing circuits are all in phase regardless of the variation in distance of the modules from the clock source. Grover describes relatively complicated circuits for producing a local clock signal having a phase midway between the outgoing and returning clock signals. These circuits rely on counters, oscillators, ramp generators and/or frequency dividing circuits that are difficult to implement, that are subject to jitter, that do not lend themselves to digital I.C. techniques, or that require substantial integrated circuit space when incorporated into IC's implementing the modules. Also the interval halving and phase lock techniques taught by Grover do not correct for local clock circuit layout path variations that contribute to phase error. In addition, when used for large distributed processor systems and complex integrated circuit designs, clock fan-out and distribution becomes a significant problem. In such systems the clock signal may have to be distributed to hundreds or thousands of modules. A single clock source capable of driving so many circuit modules is difficult to realize.

What is needed is a system for delivering synchronized clock and data signals to spatially distributed modules of a synchronous digital circuit module. The system should lend itself to digital integrated circuit fabrication techniques and should not require halving circuits, voltage controlled oscillators or other complicated circuitry at each module or circuit cluster. The system should also be relatively insensitive to noise or temperature variation and should minimize reference clock signal fan-out.

SUMMARY OF THE INVENTION

A signal deskewing system employs "outgoing" and "returning" transmission lines routed in succession to distributed circuit modules of a synchronous electronic system. A clock signal source connected to one end of the outgoing transmission line sends an outgoing clock signal down the outgoing transmission line to each module in succession. Remote ends of the outgoing and returning transmission lines are interconnected so that when the outgoing clock signal reaches the end of the outgoing transmission line it returns to each module in reverse order via the returning transmission line.

In accordance with one aspect of the invention, a deskewing circuit near each module taps into the outgoing and returning transmission lines so as to receive the outgoing and returning clock signals. Each deskewing circuit routes the outgoing clock signal through first adjustable delay circuit to produce a local clock signal for the module. The local clock signal is then routed through a similar second adjustable delay circuit to produce a reference clock signal. The deskewing circuit includes a phase lock controller for controlling the delays of the first and second circuits so that the reference clock signal is phase locked to the returning clock signal. Since the delays provided by the first and second delay circuits are identical, the local clock signal has a phase midway between phases of the outgoing and returning clock signals arriving at the deskewing circuit. Local clock signals generated in this manner by the deskewing circuits near all modules will have similar phase regardless of the variation in module distance along the outgoing and return transmission lines from the clock source.

In accordance with another aspect of the invention, a set of third delay circuits are included within each deskewing circuit. Each third delay circuit is similar to the first and second delay circuits and couples a data input terminal of one of the circuit modules to a line of a data bus routed to all deskewing circuits. Lines of the data bus have the same length and velocity of signal propagation between modules as the first and second transmission lines. The phase lock controller within each deskewing circuit adjusts the third delay circuits so that their delays match the delay of the first and second delay circuits. When a "host" circuit module located near the clock source transmits a data signal on a line of the bus, the data signal travels over the line to all deskewing circuit. The signal arrives at the deskewing circuits at different times due to variations in distance between the deskewing circuits and the host. However the third delay circuits within all deskewing circuits coupling the line to input terminals of corresponding circuit modules appropriately delay the data signal so that it arrives at the each local circuit module at the same time. Also, if the host module is near the clock source and receives the outgoing clock signal without substantial delay, then when it transmits the data signal at some time relative to a cycle of the outgoing clock signal, the signal will arrive at the other circuit modules at a similar time relative to a cycle of their local clock signals.

Thus the signal deskewing system of the present invention not only deskews a clock signal transmitted to spatially distributed circuit modules it also synchronizes transmission of data signals between a host circuit module and remote circuit modules. Since the proposed system incorporates identical delay elements that are an integral part of the clock recovery system, variations in local circuit path and module delays are inherently compensated since they are integral parts of the delay-lock loop.

In accordance with an alternative embodiment of the invention, the signal deskewing system is expanded to provide synchronized clock and data signal transmission to an M×N array of circuit modules. The local clock signal produced by each of N deskewing circuits is supplied as the clock signal to a separate row of M deskewing circuits through matching outgoing and returning transmission lines. Each of M deskewing circuits of each of N rows produces a local clock signal supplied to a corresponding local circuit module. The alternative embodiment of the invention minimizes accumulated phase jitter and reduces clock signal fan-out when clock signals must be supplied to a large number of circuit modules.

It is accordingly an object of the invention to provide a system for delivering synchronized clock signals to spatially distributed modules of a digital logic system.

It is another object of the invention to provide a system for synchronizing delivery of data signals between a host module and each local module of the circuit module.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

FIG. 3 is a timing diagram illustrating phase relationships between clock signals of FIG. 1;

FIG. 4 is a circuit diagram illustrating the adjustable delay circuit of FIG. 1 in more detail;

FIG. 5 is a circuit diagram illustrating the phase lock controller of FIG. 1 in more detail;

DESCRIPTION OF THE PREFERRED EMBODIMENT(S)

Figure 1:
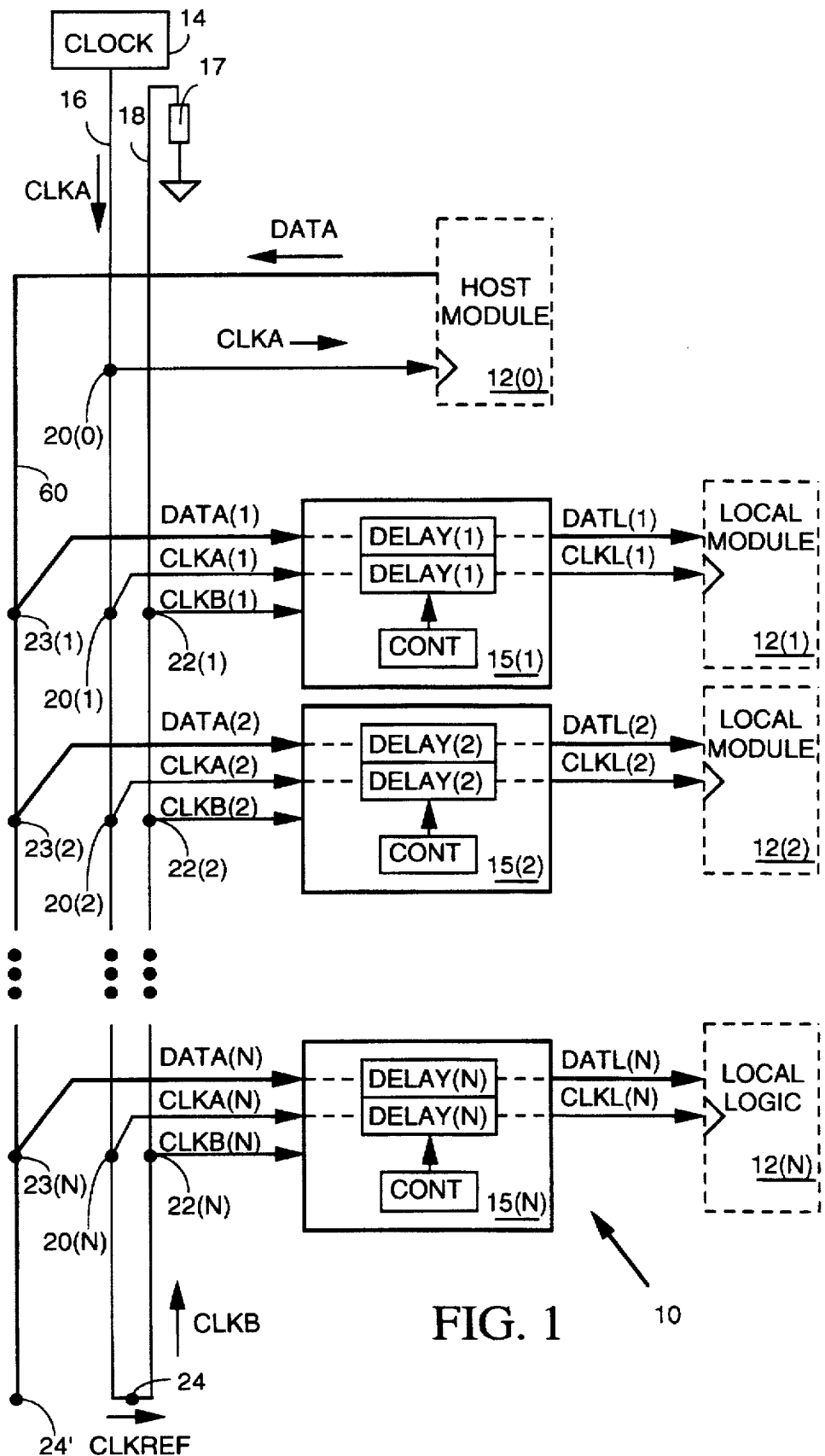
FIG. 1 illustrates in block diagram form a signal deskewing system in accordance with the present invention.

FIG. 1 illustrates in block diagram form a signal deskewing system 10 in accordance with the present invention. The deskewing system 10 delivers a set of N local clock signals CLKL(1)–CLKL(N) to a corresponding set of local circuit modules 12(1)–12(N) (destination sites) of a distributed electronic system. Each local circuit module carries out logic operations in response to the data or control signals from a host module 12(0) and those operations are synchronized to the local module's input local clock signal. Deskewing system 10 ensures all local clock signals CLKL(1)–CLK(N) are in phase with one another so that operations of the local circuit modules 12(1)–12(N) are closely synchronized.

Local clock signals CLKL(1)–CLK(N) are derived from a square wave clock signal CLKA produced by a clock signal source 14. Clock signal CLKA travels outward from source 14 along a signal conductor ("outgoing" transmission line 16) to a distant node 24. Another conductor ("returning" transmission line 18), having a velocity of propagation similar to that of line 16, is tied to line 16 at node 24. Transmission lines 16 and 18 follow substantially similar paths between clock 14 (a "first site") and the remote node 24 (a "second site"). However the end of transmission line 18 nearest clock 14 is terminated by its characteristic impedance 17 and is not connected to clock 14. Thus each clock signal pulse generated by source 14 travels outward from source 14 on line 16 to node 24, then returns toward source 14 along line 18 and terminates at impedance 17 without reflection.

Herein clock signal pulses traveling on line 16 toward node 24 are called "CLKA" signal pulses while clock signal pulses returning on line 18 from node 24 are called "CLKB" signal pulses. Note that due to the inherent delay of transmission lines 16 and 18 the apparent phase of the "CLKA/ CLKB" signal depends on where along transmission lines 16 and 18 the signal is viewed. As discussed herein below, the deskewing system produces a set of local clock signals CLKL(1)–CLK(N) which are phase locked to the CLKA/ CLKB clock signal as it appears at node 24. Herein below the CLKA/CLKB clock signal appearing at node 24 is referred to as the "CLKREF" signal.

Figure 1A:
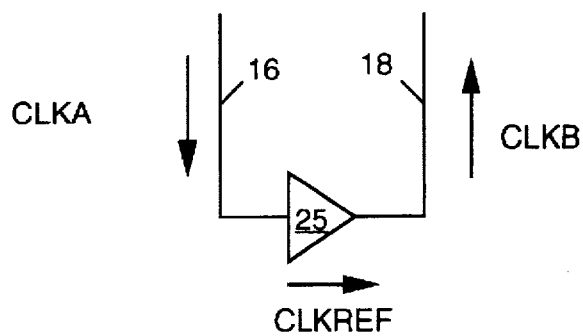
FIG. 1A illustrates an optional amplifier that may be inserted into the circuit of FIG. 1.

FIG. 1A illustrates an optional amplifier 25 which may be inserted into the connection at node 24 between lines 16 and 18 of FIG. 1. This amplifier will reduce signal attenuation when lines 16 and 18 are relatively long but otherwise would not affect circuit operation as described below.

Referring again to FIG. 1, for each local circuit module 12(1)–12(N) deskewing system 10 includes a corresponding deskewing circuit 15(1)–15(N). One purpose of the Kth deskewing circuit 12(K) (where K is any number from 0 to N) is to generate a local clock signal CLKL(K) that is in phase with the reference signal CLKREF at node 24. The deskewing circuits 15(1)–15(N) tap transmission lines 16 and 18 at varying distances from node 24 and do not directly observe the phase of reference clock signal CLKREF appearing at node 24. However the Kth deskewing circuit 15(K) indirectly ascertains the phase of the CLKREF signal from the phases of the CLKA and CLKB signals as they arrive on transmission lines 16 and 18. The Kth deskewing circuit 15(K) monitors transmission lines 16 and 18 at taps 20(K) and 22(K). Taps 20(K) and 22(K) are substantially the same distance along respective lines 16 and 18 from node 24. For purposes of the discussion below, an outgoing CLKA clock signal CLKA arriving at any tap 20(K) is labeled "CLKA(K)" and a returning CLKB clock signal arriving at a tap 22(K) is labeled "CLKB(K)".

Figure 2:
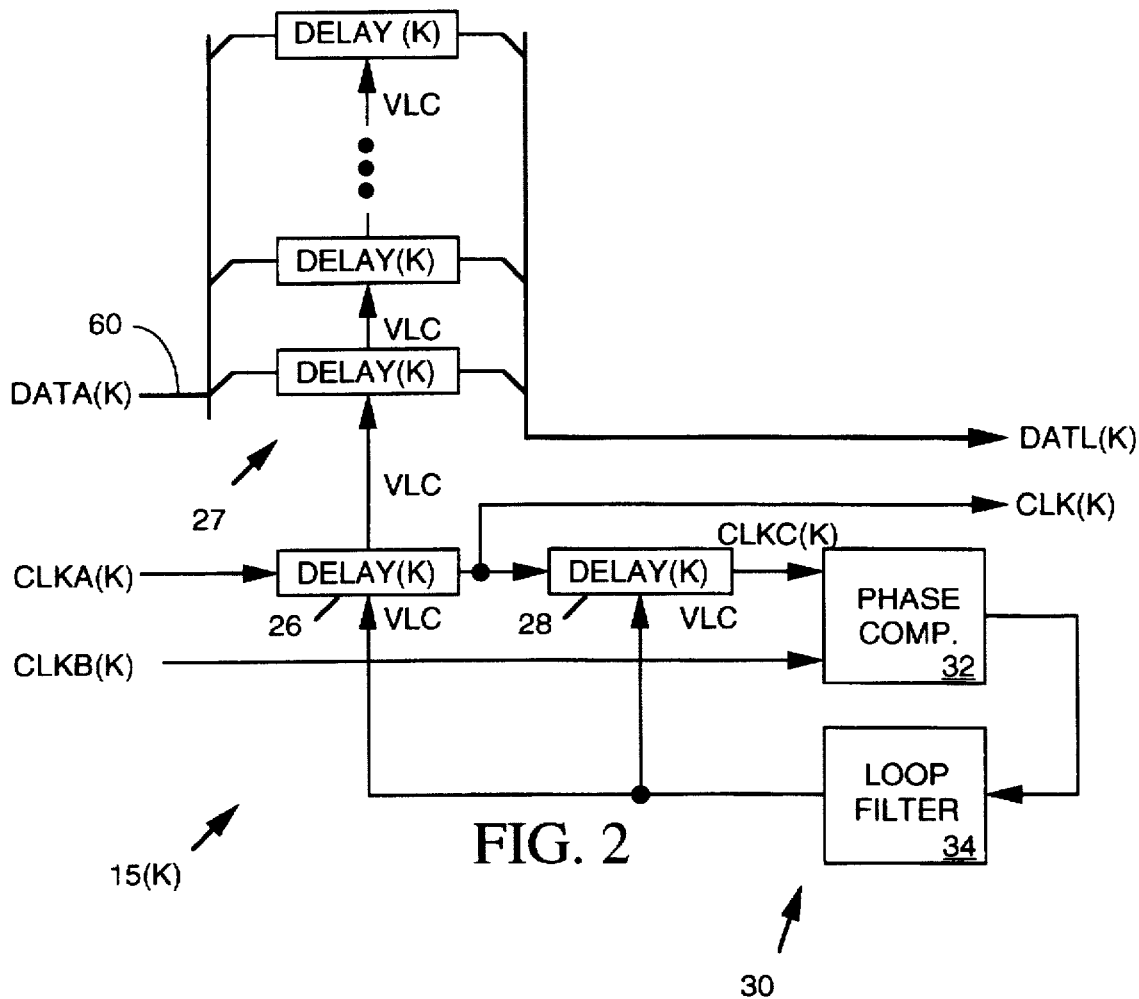
FIG. 2 illustrates a typical local deskewing circuit of FIG. 1 in more detailed block diagram form.

FIG. 2 illustrates a typical local deskewing circuit 15(K) of FIG. 1 (where K>0). As illustrated in FIG. 2 local deskewing circuit 15(K) includes an identical pair of delay circuits 26 and 28 connected such that a CLKA(K) pulse arriving at tap 20(K) passes first through delay circuit 26 and then through delay circuit 28. Delay circuits 26 and 28 in deskewing circuit 15(K) successively delay the CLKA(K) signal by similar delay times DELAY(K) to produce the local clock signal CLKL(K) at the output of delay circuits 26 and to produce a local reference clock signal CLKC(K) at the output of delay circuit 28. The magnitude of time delay DELAY(K) is controlled an analog signal VPLL produced by a phase lock controller 30 and supplied to a control input of each delay circuit 26 and 28. Phase lock controller 30 includes a phase comparator 32 for comparing the phase of the CLKB(K) signal at node 22(K) to the phase of the local reference clock CLKC(K). Comparator 32 drives its output signal high when CLKC(K) lags CLKB(K) and drives its output signal low when CLKC(K) leads CLKA(K). Controller 30 also includes a loop filter circuit 34 for low pass filtering the output of phase comparator 32 to produce a control signal VPLL. Controller 30 adjusts the magnitude of VPLL so as to phase lock CLKC(K) to CLKB(K). With CLKC(K) phase locked to CLKB(K) in all deskewing circuits 15(K), all local clock signals CLKL(1)–CLK(N) will be in phase with one another and with reference clock signal CLKREF at node 24.

FIG. 3 illustrates timing relationships between CLKA(K), a CLKB(K), CLKC(K), CLKREF and CLKL(K) (waveforms A–E, respectively) for deskewing circuit 15(K).

Referring to FIGS. 1 and 2, since delay circuits 26 and 28 provide identical delays D(K), CLKL(K) lags CLKA(K) by D(K) and leads CLKC(K) by D(K). Thus the local clock CLKL(K) is midway in phase between CLKA(K) and CLKC(K). Since CLKC(K) is in phase with CLKB(K) at node 22(K), the local clock CLKL(K) is also midway in phase between CLKA(K) and CLKB(K). Since transmission lines 16 and 18 are of similar length between node 24 and taps 20(K) and 22(K), and since lines 16 and 18 have similar velocities of propagation, a CLKA clock signal pulse requires the same amount of time to travel from tap 20(K) to node 24 as a CLKB pulse requires to travel from node 24 back to tap 22(K). Thus the reference clock signal CLKREF at node 24 is also midway in phase between CLKA(K) and CLKB(K). Since clock signal CLKREF and the local clock signals CLKL(K) are midway in phase between clock signals CLKA(K) and CLKB(K), each local clock signal CLKL(K) is phase locked to the reference clock signal CLKREF. Therefore all local clock signals CLKL(1)–CLKL (N) are in phase with one another.

FIG. 4 illustrates a suitable implementation of an adjustable delay circuit 26 or 28 of FIG. 2. This adjustable delay circuit includes a set of CMOS inverters 40 connected in series. Inverters 40 successively invert an input signal IN to produce an output signal OUT. The VPLL signal is the inverter power supply. The magnitude of VPLL controls the switching speed of the inverters, and therefor controls the overall circuit delay. The range of delay provided by the delay circuit can be adjusted by adjusting the number of inverter stages.

FIG. 5 illustrates a suitable implementation of a phase lock controller circuit 30 of FIG. 1. This circuit includes a flip-flop 44 clocked by the CLKB(K) signal and having a D input receiving the CLKC(K) signal. When the CLKC(K) signal leads CLKB(K) the Q output of flip-flop 44 is high and when CLKC(K) lags CLKB(K), the Q output is low. The Q output is supplied as input to a CMOS inverter circuit 46 connected to a supply voltage VDD and ground through resistors 48 and 50. The output of inverter 46 discharges a capacitor 52 when Q is high and charges capacitor 52 when Q is low. A unity gain amplifier 54 amplifies the voltage across capacitor 52 to produce the control signal VPLL supplied to delay circuits 26–28 of FIG. 1.

Referring again to FIG. 1, the host circuit module 12(0) is located near clock source 14 and receives the CLKA signal from clock source 14 with substantially no delay. The host module 12(0) communicates with local circuit modules 12(1)–12(N) by sending data or control signals (DATA) via a parallel bus formed by a set of transmission lines 60. Transmission lines 60 originate near clock source 14, closely follow the paths of transmission lines 16 and 18 to a distant point 24' near node 24, and have velocities of signal propagation similar to those of lines 16 and 18. As illustrated in FIGS. 1 and 2, the Kth local deskewing circuit 15(K) includes additional delay circuits 27. Each delay circuit 27 within a local deskewing circuit 15(K) corresponds to one of transmission lines 60 and links an input terminal of the Kth local circuit module 12(K) to the corresponding transmission line 60. The Kth local deskewing circuit 15(K) taps transmission lines 60 at points 23(K) thereby to receive the DATA signals from the host module 12(0). Herein we refer to the DATA signal arriving at Kth tap 23(K) as the "DATA (K)" signal. For the Kth deskewing circuit 15(K), taps 23(K) are the same distance from a distant node 24' on lines 60 as taps 20(K) and 22(K) are from node 24 on lines 14 and 16.

Referring to FIG. 2, each delay circuit 27 of deskewing circuit 15(K) delays an incoming DATA(K) signal arriving on a data line 60 and then delivers it as local data signal DATL(K) to local circuit module 12(K). Delay circuits 27 within each deskewing circuit 15(K) are similar to delay circuits 26 and 28 and are controlled by the same signal VPLL. Thus the delay provided by each delay circuit 27 in deskewing circuit 15(K) is substantially identical to the delay DELAY(K) provided by delay circuits 26 and 28. When the host circuit module 12(0) transmits a DATA signal pulse down one of lines 60, the signal pulse arrives as pulse DATA(K) at each deskewing circuit 15(K) at a different time. However delay circuits 27 delay the incoming DATA (K) pulse to compensate for the difference in signal travel time between the host circuit module 12(0) and any tap 23(K) so that the DATA signal pulse originating at host circuit module 12(0) arrives as a local data signal DATL(K) pulse at every local circuit module 12(K) the same time. In particular when the host module transmits a data signal pulse on a DATA line 60 at some interval following the leading edge of an incoming pulse of the CLKA signal, the data signal pulse will arrive at each local circuit module after a similar interval following the leading edge of a pulse of its local clock signal. Accordingly system 10 not only allows the host module to transmit DATA signal pulses concurrently to all local modules, it enables the host module to determine the timing during a CLKA cycle that the DATA signal pulses will arrive at the local modules.

Thus the deskewing system 10 of FIG. 1 supplies local clock signals to all local circuit modules 12. The local clock signals are in phase with one another regardless of the distance between the circuit modules and the reference clock source 14. The deskewing system 10 also synchronizes arrival of data signals from the host circuit module 12(0) to local circuit modules 12(1)–12(N) on bus lines 60 and allows the host circuit module to determine when such signals arrive at circuit modules during each local clock signal cycle. This close synchronization of clock and data signal timing enables the distributed circuit modules 12(1)–12(N) to operate synchronously at high frequencies under host module control despite the non-uniform signal path distances between the distributed host and local circuit modules and the reference clock source 14.

Figure 6:
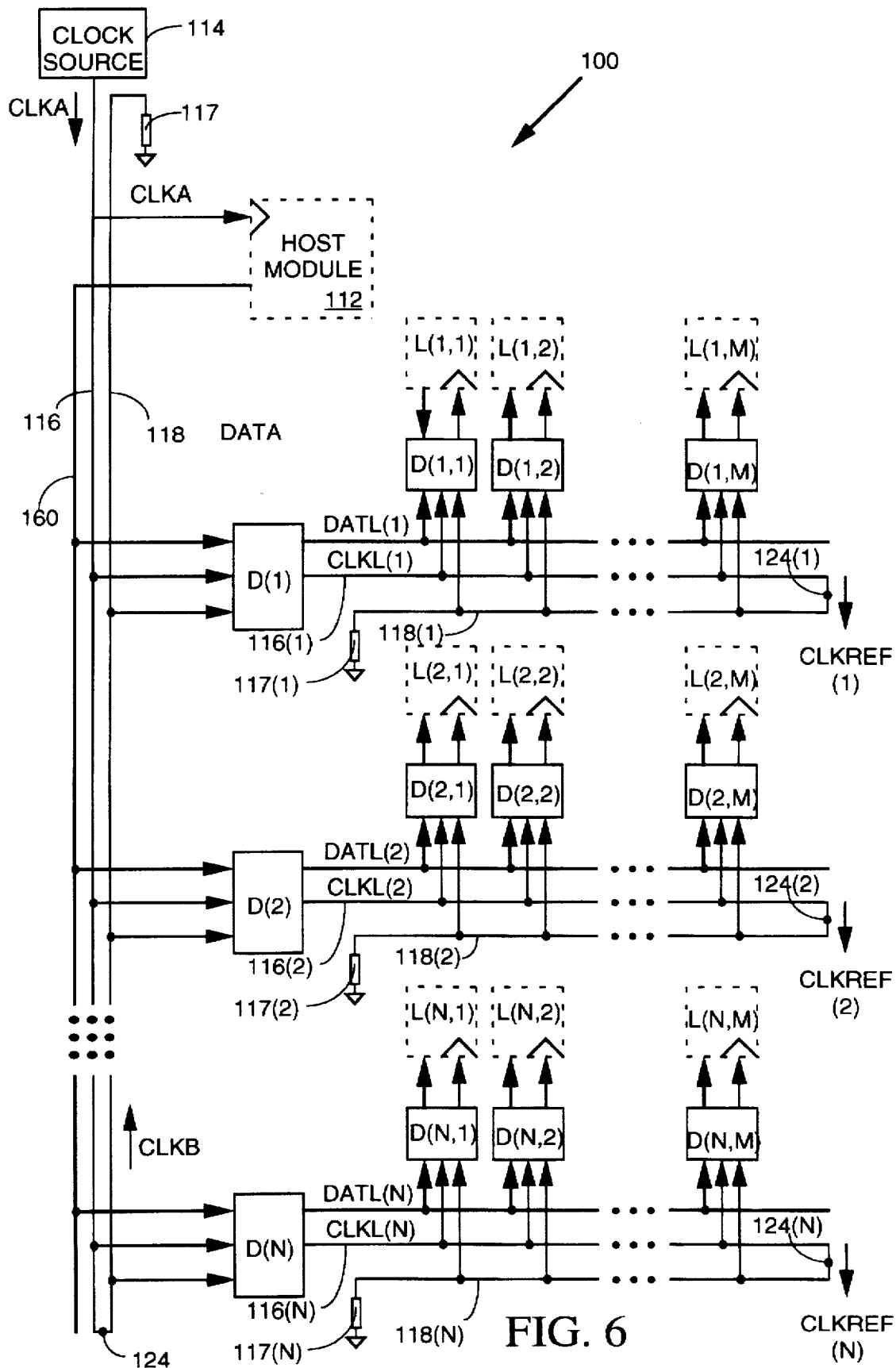
FIG. 6 is a block diagram illustrating a signal deskewing system in accordance with an alternative embodiment of the present invention.

FIG. 6 illustrates an alternative embodiment of the signal deskewing system of the present invention suitable for providing synchronized clock and data signals to a large N×M array of local circuit modules L(1,1)–L(N,M) (destination sites). The alternative deskewing system 100 includes a clock source 114, a pair of transmission lines 116 and 118, a data bus 160, and a set deskewing circuits D(1)–D(N). Transmission line 116 conveys a CLKA signal away from clock source 114 to a remote node 124 where lines 116 and 118 are interconnected. Transmission line 118 then conveys a CLKB signal away from node 124 toward its characteristic impedance termination 117 near clock source 114. Deskewing circuits D(1)–D(N) tap transmission lines 116 and 118 to acquire the CLKA and CLKB signals and operate in a manner similar to deskewing circuits 15(1)–15(N) of FIG. 1 so as to produce similar output local clock signals CLKL(1)–CLK(N). Deskewing circuits D(1)–D(N) also tap data bus 160 to acquire and delay incoming DATA signals in a manner similar to that of deskewing circuits 15(1)–15(N) of FIG. 1.

The output local clock and data signals CLKL(K) of the Kth deskewing circuit D(K) (for K=1 to N) are not, however, supplied directly to a local logic circuit as in system 10 of FIG. 1. Instead each local clock signal CLKL(K) is delivered via an outgoing transmission line 116(K) to a remote node 124(K) and returned from node 124(K) via a returning transmission line 118(K) to terminating impedance 117(K) near deskewing circuit D(K). The local data DATL(K) output of deskewing circuit D(K) is transmitted outward on a data bus 160(K) which closely tracks the paths of lines 116(K) and 118(K) and has similar velocity of propagation. A set of M deskewing circuits D(K,1)–D(K,M) tap lines 116(K) and 118(K) and data bus 160(K) to acquire the outgoing and returning CLKL(K) pulses and to acquire the local data signals DATL(K).

Deskewing circuits D(1,1)–D(N,M) are each similar to deskewing circuit 15(1) or 15(K) of FIG. 2 and operate in a similar manner to produce output local clock signals which are midway in phase between outgoing and returning local clock signals appearing at the taps on lines 116(K) and 118(K). Thus output clock signals produced by deskewing circuits D(K,1)–D(K,M) are phase locked to the local clock signal output of deskewing circuit D(K) appearing at remote node 124(K) as reference signal CLKREF(K).

Since all local clock signals CLKL(1)–CLK(N) are in phase with one another, then by using transmission lines 116(1)–116(N) and 118(1)–118(N) of similar length and signal propagation characteristics, all reference clock signals CLKREF(1)–CLKREF(N) at nodes 124(1)–124(N) will be in phase with one another. Thus the local clock output signals produced by all deskewing circuits D(K,P) (for K=1 to N and P=1 to M) will be in phase with one another.

In this embodiment, a host module 112 located near clock source 114 acts transmits data outward to other modules on data bus lines 160 which follow paths similar to those of transmission lines 116 and 118 and have similar signal propagation characteristics. When host module 112 transmits a DATA signal pulse via bus 160, delay circuits in the various deskewing circuits ensure that the DATA pulse will arrive at all local circuit modules L(K,P) at the same time. Moreover, if the host module transmits the DATA signal pulse at some known interval after receipt of the leading edge of the CLKA signal, the pulse will arrive at each local circuit module after the same interval following the leading edge of an incoming local clock signal pulse.

The two-dimensional arrayed system 100 of FIG. 6 has an advantage over the one-dimensional arrayed system 10 of FIG. 1 in that it reduces the fan-out of the CLKA, CLKB clock signals. For example if a system had 400 local circuit modules, clock source 14 of FIG. 1 would have to supply its clock signal to all 400 modules. On the other hand, using the system of FIG. 6 to service a 20×20 array of local circuit modules, clock source 114 need drive only 20 deskewing circuits. Also for a given number of local circuit modules, the two-dimensional array system of FIG. 6 will exhibit less clock signal jitter.

It should be understood that while FIG. 6 shows regular arrays of deskewing circuits and modules, it is intended that the array be only logical and not necessarily spatial. That is, it is not necessary that the deskewing circuits or logic modules be physically arranged in rows and columns as shown. It is intended only that data and clock signal lines be routed to the modules in the order illustrated.

It should also be understood that the two dimensional system of FIG. 6 can be expanded to three (or more) dimensions by supplying the local clock outputs of deskewing circuits D(1,1)–D(N,M) through outgoing/returning transmission lines to additional arrays of deskewing circuits instead of using them for directly clocking local circuit modules. Thus the deskewing system of the present invention can be expanded to synchronize very large multi-dimensional arrays of local circuit modules with relatively low clock signal fan-out.

While the forgoing specification has described preferred embodiment(s) of the present invention, one skilled in the art may make many modifications to the preferred embodiment without departing form the invention in its broader aspects. For example signal conductors 16 and 18 may be fiber optic lines and the clock signals they convey may be modulated light signals. In such case deskewing circuits 15 would include well-known circuits for converting the modulated light signals into electronic CLKA and CLKB signals. The appended claims therefore are intended to cover all such modifications as fall within the true scope and spirit of the invention.

What is claimed is:

1. An apparatus for producing synchronized local clock signals for spatially distributed modules of an electronic circuit, the apparatus comprising:

means for generating a first clock signal at a first site;

signal transmission means for conveying said first clock signal from said first site to a second site, and then returning a second clock signal from the second site back toward said first site, the second clock signal being produced at said second site in response to said first clock signal; and a plurality of deskewing circuits, each deskewing circuit corresponding to a separate one of the modules, each deskewing circuit being connected for receiving the first and second clock signals from said transmission means and delaying the first clock signal with a deskewing delay proportional to a phase relationship between the first and second clock signals thereby to produce a local clock signal for the corresponding module, wherein each said deskewing circuit comprises:

first delay means for receiving said first clock signal from said transmission means and delaying said first clock signal by an adjustable first delay time to produce the local clock signal for the corresponding module;

second delay means for receiving said local clock signal from said first delay means and delaying the local clock signal by an adjustable second delay time to produce a local reference signal; and phase lock means receiving said local reference signal and said second clock signal for adjusting said first and second delay times such that said local reference signal is phase locked to said second clock signal.

2. The apparatus in accordance with claim 1 wherein said signal transmission means comprises:

a first conductor for conveying said first clock signal, said first conductor being routed from said first site to each of said deskewing circuits in said succession and then to said second site; and a second conductor for conveying said second clock signal, said second conductor being coupled to said first conductor at said second site and being routed from said second site to each of said deskewing circuits in said reverse succession.

3. The apparatus in accordance with claim 1 wherein said signal transmission means comprises:

a first conductor routed from said first site to each of said deskewing circuits in said succession and then to said second site;

a second conductor routed from said second site to each of said deskewing circuits in said reverse succession; and amplifier means at said second site receiving said first clock signal from said first conductor and amplifying said first clock signal to produce said second clock signal, and transmitting said second clock signal via said second conductor.

4. The apparatus in accordance with claim 2 wherein said first and second conductors have similar velocities of signal propagation and are of similar length between each of said deskewing circuits and said second site.

5. An apparatus for producing synchronized local clock signals for spatially distributed modules of an electronic circuit, the apparatus comprising:

means for generating a first clock signal at a first site;

signal transmission means for conveying said first clock signal from said first site to a second site, and then returning a second clock signal from the second site back toward said first site, the second clock signal being produced at said second site in response to said first clock signal; and a plurality of deskewing circuits, each deskewing circuit corresponding to a separate one of the modules, each deskewing circuit being connected for receiving the first and second clock signals from said transmission means and delaying the first clock signal with a deskewing delay proportional to a phase relationship between the first and second clock signals thereby to produce a local clock signal for the corresponding module, and second signal transmission means for conveying data signals, wherein each deskewing circuit further comprises means for conveying said data signals between said second transmission means and a corresponding circuit module with a delay equal to said deskewing delay.

6. The apparatus in accordance with claim 5 wherein each said deskewing circuit comprises:

first delay means for receiving said first clock signal from said transmission means and delaying said first clock signal by an adjustable first delay time to produce the local clock signal for the corresponding module;

second delay means for receiving said local clock signal from said first delay means and delaying the local clock signal by an adjustable second delay time to produce a local reference signal;

third delay means for conveying said data signals between said second signal transmission means and the corresponding module with an adjustable third delay time; and phase lock means for receiving said local clock signal and said second clock signal and for adjusting said first and second delay times to equal values such that said local reference signal is phase locked to said second clock signal and for adjusting said third delay time to equal said first and second delay times.

7. The apparatus in accordance with claim 6 wherein said first signal transmission means comprises a first conductor routed from said first site to each of said deskewing circuits in succession and then to said second site, a second conductor coupled to said first conductor at said second site and routed from said second site to each of said deskewing circuits in reverse succession, wherein said second signal transmission means comprises a third conductor routed to each of said deskewing circuits in succession, and wherein said first, second and third conductors have similar velocities of signal propagation and are of similar length between said deskewing circuits.

8. An apparatus for providing a separate local clock signal to each module of an array of rows and columns of modules of an electronic circuit, the apparatus comprising:

means for generating a first clock signal at a first site;

a plurality of first deskewing circuits, each corresponding to a separate row of the modules, each first deskewing circuit supplying an output local clock signal to a separate module of the corresponding module row;

a plurality of rows of second deskewing circuits each row of second deskewing circuits corresponding to a separate one of said first deskewing circuits;

first signal transmission means for conveying said first clock signal from said first site to each of said first deskewing circuits in succession and then to a second site, and then returning a second clock signal from the second site back to each of said first deskewing circuits in reverse succession, the second clock signal being produced at said second site in response to said first clock signal, wherein each first deskewing circuit comprises means for receiving the first and second clock signals from said first transmission means and for delaying the first clock signal with a deskewing delay proportional to a phase relationship between the first and second clock signals, each first deskewing circuit thereby producing a separate first local clock signal for a corresponding row of said second deskewing circuits;

a plurality of second signal transmission means, each corresponding to one of said first deskewing circuits and its corresponding row of second deskewing circuits, for conveying an outgoing first local clock signal produced by the corresponding first deskewing circuit successively to a corresponding row of second deskewing circuits, then to a remote site, and then returning the first local clock signal from the remote site back in reverse succession to each of second deskewing circuits of the corresponding row, wherein each second deskewing circuit comprises means for receiving an outgoing and returning first local clock signal from said second transmission means and delaying the outgoing first local clock signal with a deskewing delay proportional to a phase relationship between the received outgoing and returning first local clock signals, thereby to produce an output second local clock signal for a corresponding one of said modules.

9. The apparatus in accordance with claim 8 wherein each said first deskewing circuit comprises:

first delay means for receiving said first clock signal from said first transmission means and delaying said first clock signal by an adjustable first delay time to produce its output local clock signal;

second delay means for receiving said local clock signal from said first delay means and delaying the local clock signal by an adjustable second delay time to produce a local reference signal; and phase lock means for receiving said local reference signal and said second clock signal and for adjusting said first and second delay times such that said local reference signal is phase locked to said second clock signal.

10. A method for producing synchronized local clock signals for spatially distributed modules of an electronic circuit, the method comprising the steps of:

(a) transmitting a reference clock signal from a first site past each of said modules in succession, then to a second site, and then from the second site back past each of said modules in reverse succession; and (b) acquiring and delaying the reference clock signal arriving near each module from said first site with a first delay proportional to a phase relationship between the reference clock signal as it arrives near the module from said first and second sites, thereby to produce a separate local clock signal for said each module, wherein step (a) comprises the substeps of:

delaying said reference clock signal arriving at each module from said first site by an adjustable first delay time to produce the local clock signal for each local module;

delaying the local clock signal produced at each module by an adjustable second delay time to produce a separate reference clock signal at each module; and adjusting said first and second delay times for each module such that the reference clock signal at the module is phase locked to said reference clock signal arriving at the module from said second site.

11. A method for providing synchronized local clock signals to each of a plurality of spatially distributed circuit modules and for controlling transmission time of data signals transmitted between the modules via a data line interconnecting the modules, comprising the steps of:

delivering a reference clock signal to each of said circuit modules in succession via a first transmission line and then to a remote end of said first transmission line;

returning said reference clock signal to each of said circuit modules in reverse succession from said remote end of said first transmission line via a second transmission line coupled to said first transmission line at said remote end;

delaying said reference clock signal by an adjustable first delay time as it arrives at each of said circuit modules thereby to produce a separate local clock signal at each of said circuit modules;

delaying the local clock signal at each of said circuit modules by an adjustable second delay time thereby to produce a separate reference clock at each of said circuit modules;

delaying transmission of data signals between each module and said data line with an adjustable third delay;

adjusting the first and second delay times in each circuit module so as to phase lock the reference clock at the module to the reference clock signal as it arrives at the module on said second transmission line.

12. The method in accordance with claim 11 further comprising the step of adjusting the third delay time to be equal to said first delay time.

13. The method in accordance with claim 12 wherein said first, second and third delay times are all adjusted to equal values.

14. A method for producing synchronized clock signals at a plurality of spatially distributed destination sites comprising the steps of:

(a) transmitting a first clock signal from a first site to each of said destination sites in succession, then to a third site, and then from the third site back to each of said destination sites in reverse succession; and (b) delaying the first clock signal arriving at each of said destination sites from said first site with a delay proportional to a phase relationship between the first clock signal as it arrives at the second site from said first and third sites, thereby to produce a separate second clock signal at each destination site, wherein step (b) comprises the steps of:

delaying the first clock signal arriving at each destination site from said first site with an adjustable first delay thereby to produce a second signal at each destination site;

delaying the second clock signal by an adjustable second delay time thereby to produce a delayed second clock signal at each destination site; and adjusting the first and second delays at each destination site such that said delayed second clock signal at each destination site is phase locked to the first clock signal arriving at each destination site from said third site.

15. A method for producing synchronized local clock signals for an array of M rows and N columns of spatially distributed destination sites, where N and M are each integers greater than one, the method comprising the steps of:

(a) transmitting a first clock signal from a first site to each of a set of N second sites in succession, then to a third site, and then from the third site back to each of said N second sites in reverse succession;

(b) delaying the first clock signal arriving at each of said N second sites from said first site with a delay proportional to a phase relationship between the first clock signal as it arrives at the second site from said first and third sites, thereby to produce a separate second clock signal at each of said N second sites, wherein each second clock signal corresponds to a separate row of M destination sites;

(c) transmitting the second clock signal produced at each of said N second sites to the corresponding row of destination sites in sequence, then to a fourth site, and then from the fourth site back to the corresponding row of destination sites in reverse sequence; and (d) delaying the second clock signal arriving at each destination site from said second site with a second delay proportional to a phase relationship between the second clock signal as it arrives at the destination site from said second and fourth sites, thereby to produce a separate third clock signal at each destination site.

16. The method in accordance with claim 15 wherein step (b) comprises the steps of:

delaying the first clock signal arriving at each second site from said first site with an adjustable first delay thereby to produce said second signal;

delaying the second clock signal by an adjustable second delay time thereby to produce a delayed second clock signal at each second site; and adjusting the first and second delays at each second site such that said delayed second clock signal at each second site is phase locked to the first clock signal arriving at each second site from said third site.

* * * * *